United States Patent Office 3,471,510
Patented Oct. 7, 1969

3,471,510
3-AMINO-2-IMINO-4-(5-NITRO-2-FURYL)-Δ⁴-THIAZOLINE HYDROCHLORIDE
Louis Edmond Benjamin, 49 Canasawacta St.,
Norwich, N.Y. 13815
No Drawing. Filed Dec. 16, 1966, Ser. No. 602,179
Int. Cl. C07d *91/26;* A61k *27/00*
U.S. Cl. 260—306.7
2 Claims

ABSTRACT OF THE DISCLOSURE

Antibacterially active 3 - amino-2-imino-4-(5-nitro-2-furyl)-Δ⁴-thiazoline hydrochloride and a method for preparing it by reacting 5-nitro-2-furyl thiocyanatomethyl ketone with hydrazine.

---

This invention relates to chemical compounds and more particularly to the compound 3-amino-2-imino-4-(5-nitro-2-furyl)-Δ⁴-thiazoline hydrochloride of the formula:

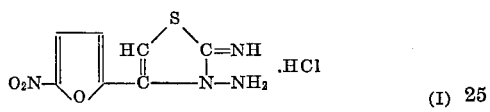

(I)

and to compositions containing it.

The compound of Formula I is crystalline and lowly soluble in water. It displays a wide antibacterial spectrum against both gram-negative and gram-positive bacteria when tested in accordance with the commonly used serial dilution technique. Results secured pursuant to such testing are exemplified in the following table:

| Organism: | Inhibiting concentration in mg./ml. |
|---|---|
| S. aureus | 3.0 |
| E. coli | 0.38 |
| S. typhosa | 1.5 |
| S. pyogenes | 0.75 |
| S. agalactiae | 12.5 |
| E. insidiosa | 0.75 |
| A. aerogenes | 12.5 |

By virtue of its broad antibacterial spectrum the compound of Formula I is adapted to be combined in the form of dusts, sprays, solutions, suspensions and the like for the purpose of controlling bacterial contamination.

The compound of Formula I is also useful in the field of veterinary medicine. In such application it has been found effective in the therapy for salmonelloses in poultry. When admixed at a level of from 0.0055–0.022% by weight in the ration of chickens infected with *Salmonella gallinarum* or *Salmonella typhimurium* and said ration offered ad libitum to said chickens, control of infection is obtained. The incorporation of the compound of Formula I in poultry ration is readily effected by uniformly distributing the compound in poultry feed by commonly used methods such as tumbling, grinding, stirring or blending.

The method which is currently preferred for the preparation of the compound of Formula I consists in reacting 5-nitro-2-furyl thiocyanatomethyl ketone with hydrazine. In carrying out this reaction an inert solvent such as methanol is commonly employed and the application of heat is advantageous to hasten the reaction.

In order that this invention may be readily available to and fully understood to those skilled in the art, the following details of its preparation are set forth:

A mixture of 5-nitro-2-furyl thiocyanatomethyl ketone (93 g., 0.44 mole) and hydrazine dihydrochloride (46.2 g., 0.44 mole) in methanol (2300 ml.) is heated at reflux for 2 hrs. Charcoal is added during the last ten mins. of reflux. The hot solution is filtered, cooled and diluted to 6 l. with ether to give brown crystals. The product is collected by filtration and air dried to give 48 g. (41%); M.P. Ca. 270° (dec.). A solution of the product (48 g.) in 3 N hydrochloric acid (15 ml./g.) is boiled with charcoal, filtered and cooled to give yellow platelets (22 g.); M.P. 270–271° (dec.).

*Analysis.*—Calcd. for $C_7H_6N_4O_3S \cdot HCl$: C, 32.00; H, 2.69; N, 21.33. Found: C, 32.14; H, 2.68; N, 21.27.

What is claimed is:
1. The compound 3-amino-2-imino-4-(5-nitro-2-furyl)-Δ⁴-thiazoline hydrochloride.
2. A method for preparing the chemical compound of claim 1, which comprises reacting 5-nitro-2-furyl thiocyanatomethyl ketone with hydrazine.

References Cited

Beyer et al.: Ber. deut. Chem., vol. 86, pp. 764–769 (1953).

Saldabol et al.: J. Gen. Chem. U.S.S.R. (Consultants Bureau English Translation), vol. 34, pp. 1608–1610 (1964).

ALTON D. ROLLINS, Primary Examiner

U.S. Cl. X.R.
424—270